United States Patent
Kermani et al.

(10) Patent No.: US 11,442,266 B1
(45) Date of Patent: Sep. 13, 2022

(54) METHOD AND DEVICE FOR CORRECTING CHROMATIC ABERRATION IN MULTIPLE BANDS

(71) Applicant: Apple Inc., Cupertino, CA (US)

(72) Inventors: Zahra Sadeghipoor Kermani, Berlin (DE); Sheng Lin, San Jose, CA (US); Emmanuel Piuze Phaneuf, Sunnyvale, CA (US); Ryan Joseph Dunn, Santa Cruz, CA (US); Joachim Michael Deguara, Felton, CA (US); Farhan A. Baqai, Fremont, CA (US)

(73) Assignee: APPLE INC., Cupertino, CA (US)

( * ) Notice: Subject to any disclaimer, the term of this patent is extended or adjusted under 35 U.S.C. 154(b) by 315 days.

(21) Appl. No.: 16/906,473

(22) Filed: Jun. 19, 2020

Related U.S. Application Data

(60) Provisional application No. 62/897,680, filed on Sep. 9, 2019.

(51) Int. Cl.
    *G03F 3/08*      (2006.01)
    *G02B 27/00*      (2006.01)
    *G06T 5/00*      (2006.01)

(52) U.S. Cl.
    CPC ............ *G02B 27/005* (2013.01); *G06T 5/006* (2013.01)

(58) Field of Classification Search
    None
    See application file for complete search history.

(56) References Cited

U.S. PATENT DOCUMENTS

| | | | | |
|---|---|---|---|---|
| 11,367,166 | B1* | 6/2022 | Kermani | ............... G06T 5/001 |
| 2006/0239549 | A1* | 10/2006 | Kelly | .................... G06T 5/10 382/167 |
| 2017/0230546 | A1* | 8/2017 | Lebrun | ................. H04N 5/148 |
| 2018/0158175 | A1* | 6/2018 | Shmunk | .................. G06T 5/20 |
| 2019/0385288 | A1* | 12/2019 | Stewart | ................... G06T 5/002 |

* cited by examiner

*Primary Examiner* — Dung D Tran
(74) *Attorney, Agent, or Firm* — Fernando & Partners, LLP

(57) ABSTRACT

In one implementation, a method includes obtaining an image. The method includes splitting the image to produce a high-frequency component image and a low-frequency component image. The method includes downsampling the low-frequency component image to generate a downsampled low-frequency component image. The method includes correcting color aberration of the downsampled low-frequency component image to generate a color-corrected downsampled low-frequency component image. The method includes upsampling the color-corrected downsampled low-frequency component image to generate a color-corrected low-frequency component image. The method includes combining the color-corrected low-frequency component image and the high-frequency component image to generate a color-corrected version of the image.

20 Claims, 9 Drawing Sheets

|     |     |     |     |     |
|-----|-----|-----|-----|-----|
| p11 | p12 | p13 | p14 | p15 |
| p21 | p22 | p23 | p24 | p25 |
| p31 | p32 | p33 | p34 | p35 |
| p41 | p42 | p43 | p44 | p45 |
| p51 | p52 | p53 | p54 | p55 |

FIG. 3

METHOD AND DEVICE FOR CORRECTING CHROMATIC ABERRATION IN MULTIPLE BANDS

CROSS-REFERENCE TO RELATED APPLICATIONS

This application claims priority to U.S. Provisional Patent App. No. 62/897,680, filed on Sep. 9, 2019, which is hereby incorporated by reference in its entirety.

TECHNICAL FIELD

The present disclosure relates generally to image processing, and in particular, to correcting chromatic aberration in an image.

TECHNICAL FIELD

The present disclosure relates generally to image processing, and in particular, to correcting chromatic aberration in an image.

BACKGROUND

Various optical systems exhibit chromatic aberration. Reducing such chromatic aberration using hardware can be expensive or impossible due to size constraints of the optical system. Further, reducing such chromatic aberration using software can be computationally expensive or ineffective.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 illustrates a neighborhood of pixels surrounding a pixel of a YCbCr image.

Figure 1A:
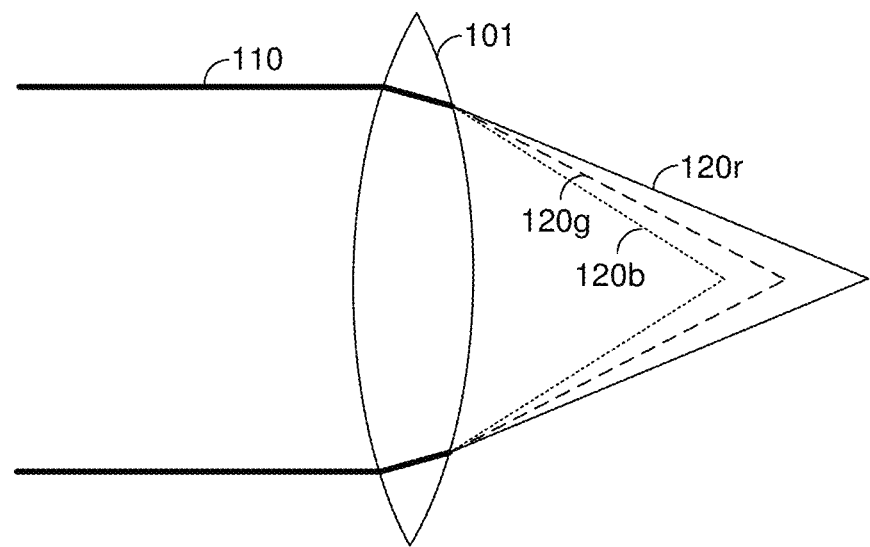
FIG. 1A illustrates a lens exhibiting axial chromatic aberration.

In accordance with common practice, various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE IMPLEMENTATIONS

Deficiencies of optical lenses result in different distortions in captured images. One important category of these distortions is chromatic aberration. Chromatic aberration occurs as the refractive index of the lens is a function of wavelength. As a result, the images of different color channels (red, green, and blue) are not focused on the same plane (axial chromatic aberration or longitudinal chromatic aberration) or they are scaled differently (transverse chromatic aberration or lateral chromatic aberration).

FIG. 1A illustrates a lens 101 exhibiting axial chromatic aberration. White light 110 enters the lens 101 and is refracted into red light 120r, green light 120g, and blue light 120b. The red light 120r, green light 120g, and blue light 120b each focus at a different distance from the lens 101. Thus, in an image captured using the lens 101, assuming the green channel is in focus, the red channel and blue channel are blurred.

Figure 1B:
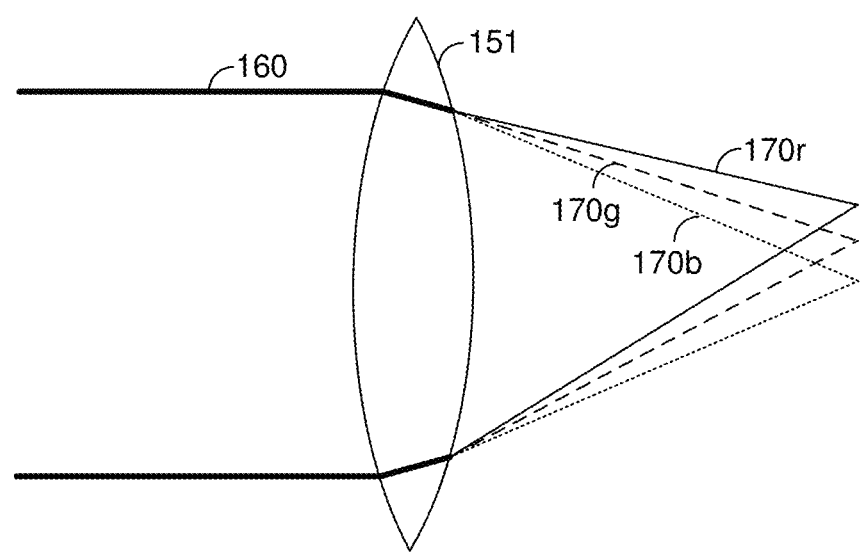
FIG. 1B illustrates a lens exhibiting transverse chromatic aberration.

FIG. 1B illustrates a lens 151 exhibiting transverse chromatic aberration.

White light 160 enters the lens 151 and is refracted into red light 170r, green light 170g, and blue light 170b. The red light 170r, green light 170g, and blue light 170b each focus at a different angle from the optical axis of the lens 151. Thus, in an image captured using the lens 151, the red channel, green channel, and blue channel are offset and/or at different magnifications.

When the same object in an image has different sizes in the red channel, green channel, and blue channel, the color edges are not co-located. Thus, an achromatic edge will appear colored and false colors will be observed around edges in the image. Image processing techniques described below reduce or mitigate the presence of chromatic aberration in a captured image.

Figure 2A:
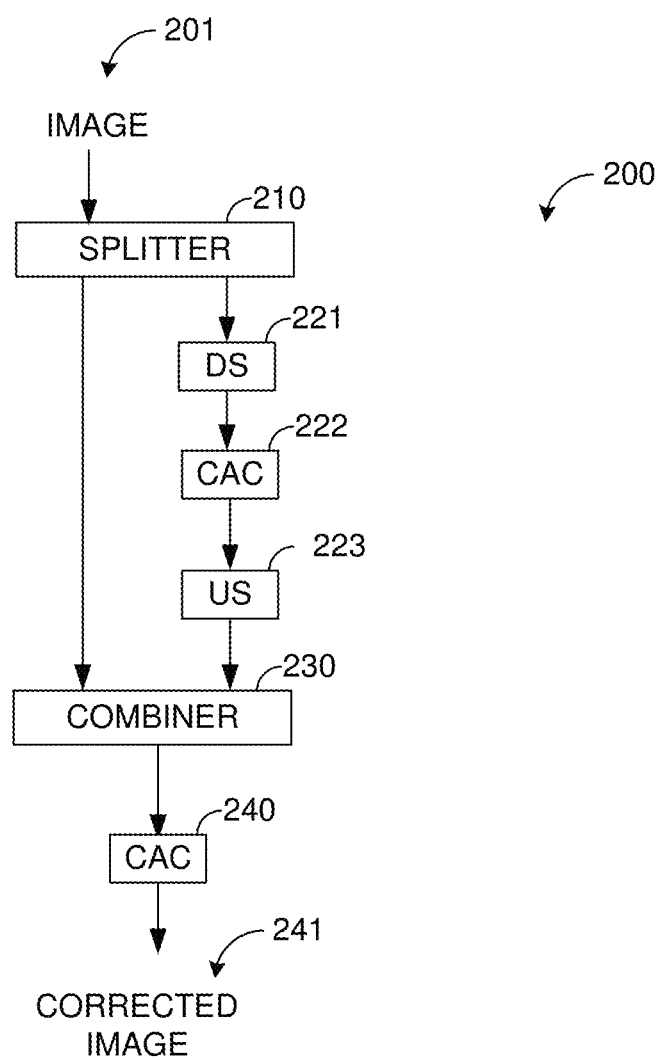
FIG. 2A illustrates a functional block diagram of a two-band chromatic aberration correcting device.

FIG. 2A illustrates a functional block diagram of a two-band chromatic aberration correcting device 200. The device 200 receives, as an input, an image 201. The image 201 includes a matrix of pixels, each pixel associated with a respective pixel value. In various implementations, the pixel value is a triplet of values. For example, in various implementations, the image 201 is an RGB image and each pixel is associated with a red value, a green value, and a blue value. As another example, in various implementations, the image 201 is a YCbCr image and each pixel is associated with a luma value, a blue-chroma value and a red-chroma value. Thus, in various implementations, the image 201 includes multiple channels, each channel including a matrix of pixels, each pixel associated with a respective value. For example, in various implementations, the image 201 is an RGB image and includes a red channel, a green channel, and a blue channel. As another example, in various implementations, the image 201 is a YCbCr image and includes a luma channel, a blue-chroma channel, and a red-chroma channel.

The image 201 is fed into a splitter 210 which splits the image into a low-frequency portion of the image 201 and a high-frequency portion of the image 201. The low-frequency portion of the image 201 is fed into a downsampler 221. In various implementations, the downsampler 221 downsamples the low-frequency portion of the image by a factor of two (both vertically and horizontally). The downsampled low-frequency portion of the image 201 is fed into a chromatic aberration corrector 222 that corrects chromatic aberration in the downsampled low-frequency portion of the image 201 (as will be described in greater detail below). The corrected downsampled low-frequency portion of the image 201 is fed into an upsampler 223. In various implementations, the upsampler 223 upsamples the corrected downsampled low-frequency portion of the image 201 by a factor of two (both vertically and horizontally).

Both the corrected low-frequency portion of the image 201 and the high-frequency portion of the image 201 are fed into a combiner 230 which combines the corrected low-frequency portion of the image 201 and the high-frequency portion of the image 201. In various implementations, the combiner 230 adds the corrected low-frequency portion of the image 201 and the high-frequency portion of the image 201 together. In various implementations, the combiner 230 weights the corrected low-frequency portion of the image 201 and the high-frequency portion of the image 201 before adding them together.

In various implementations, the output of the combiner 230 is fed into a second chromatic aberration corrector 240 which generates a corrected image 241. In various implementations, the output of the combiner 240 is the corrected image 241 and the device 200 does not include a second chromatic aberration corrector 231.

Figure 2B:
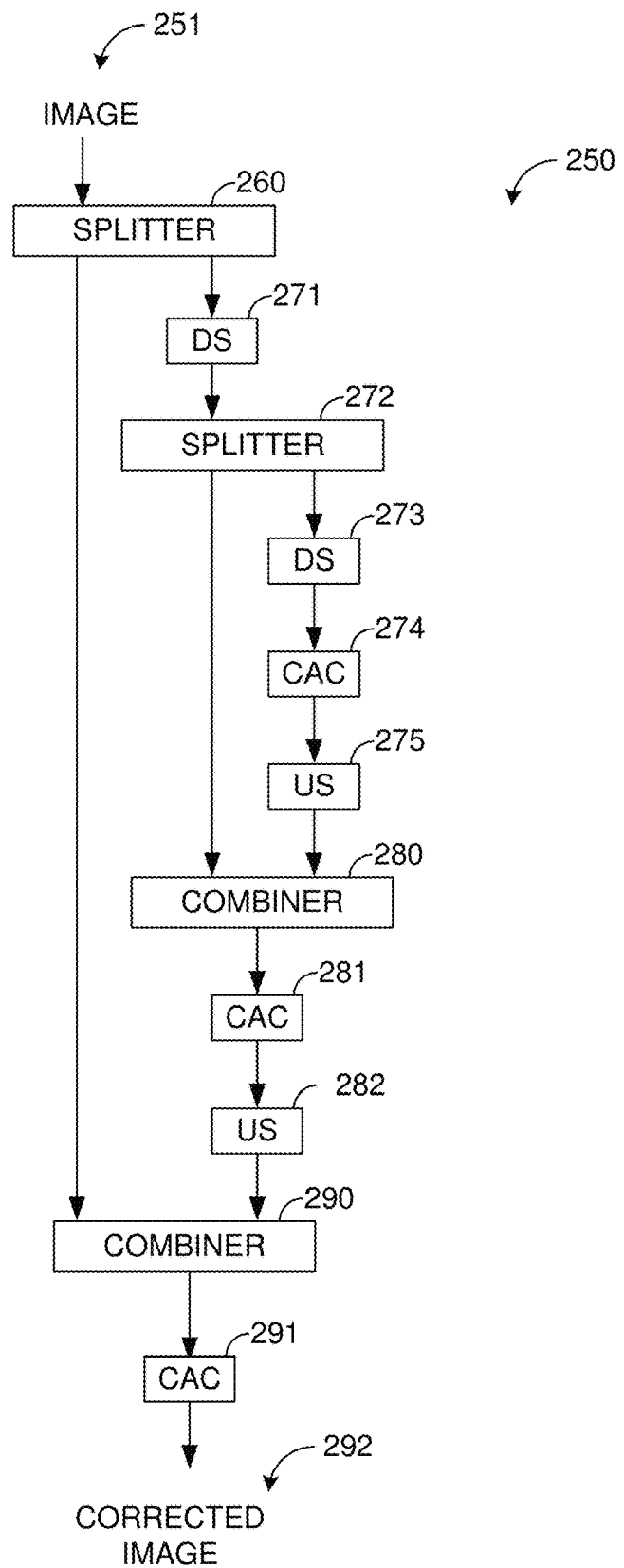
FIG. 2B illustrates a functional block diagram of a three-band chromatic aberration correcting device.

FIG. 2B illustrates a functional block diagram of a three-band chromatic aberration correcting device 250. The device 250 receives, as an input, an image 251. The image 251 includes a matrix of pixels, each pixel associated with a respective pixel value. In various implementations, the pixel value is a triplet of values. For example, in various implementations, the image 251 is an RGB image and each pixel is associated with a red value, a green value, and a blue value. As another example, in various implementations, the image 251 is a YCbCr image and each pixel is associated with a luma value, a blue-chroma value and a red-chroma value. Thus, in various implementations, the image 251 includes multiple channels, each channel including a matrix of pixels, each pixel associated with a respective value. For example, in various implementations, the image 251 is an RGB image and includes a red channel, a green channel, and a blue channel. As another example, in various implementations, the image 251 is a YCbCr image and includes a luma channel, a blue-chroma channel, and a red-chroma channel.

The image 251 is fed into a first splitter 260 which splits the image into a low-frequency portion of the image 251 and a high-frequency portion of the image 251. The low-frequency portion of the image 251 is fed into a first downsampler 271. In various implementations, the first downsampler 271 downsamples the low-frequency portion of the image by a factor of two (both vertically and horizontally). The downsampled low-frequency portion of the image 251 is fed into a second splitter 272 which splits the low-frequency portion of the image 251 into a low-low-frequency portion of the image 251 and a high-low-frequency portion of the image 251. The low-low-frequency portion of the image 251 is fed into a second downsampler 273. In various implementations, the second downsampler 273 downsamples the low-low-frequency portion of the image by a factor of two (both vertically and horizontally). The downsampled low-low-frequency portion of the image 251 is fed into a chromatic aberration corrector 274 that corrects chromatic aberration in the downsampled low-low-frequency portion of the image 251. The corrected downsampled low-low-frequency portion of the image 251 is fed into a first upsampler 275. In various implementations, the first upsampler 275 upsamples the corrected downsampled low-low-frequency portion of the image 251 by a factor of two (both vertically and horizontally).

Both the corrected low-low-frequency portion of the image 251 and the high-low-frequency portion of the image 251 are fed into a first combiner 280 which combines the corrected low-low-frequency portion of the image 251 and the high-low-frequency portion of the image 251. In various implementations, the combiner 280 adds the corrected low-low-frequency portion of the image 251 and the high-low-frequency portion of the image 251 together. In various implementations, the combiner 280 weights the corrected low-low-frequency portion of the image 251 and the high-low-frequency portion of the image 251 before adding them together.

In various implementations, the output of the first combiner 280 is fed into a second chromatic aberration corrector 281 which generates a corrected downsampled low-frequency portion of the image 251. In various implementations, the output of the first combiner 280 is the corrected downsampled low-frequency portion of the image 251 and the device 250 does not include a second chromatic aberration corrector 281.

The corrected downsampled low-frequency portion of the image 251 is fed into a second upsampler 282. In various implementations, the second upsampler 282 upsamples the corrected downsampled low-frequency portion of the image 251 by a factor of two (both vertically and horizontally).

Both the corrected low-frequency portion of the image 251 and the high-frequency portion of the image 251 are fed into a second combiner 290 which combines the corrected low-frequency portion of the image 251 and the high-frequency portion of the image 251. In various implementations, the second combiner 290 adds the corrected low-frequency portion of the image 251 and the high-frequency portion of the image 251 together. In various implementations, the combiner 280 weights the corrected low-frequency portion of the image 251 and the high-frequency portion of the image 251 before adding them together.

In various implementations, the output of the second combiner 280 is fed into a third chromatic aberration corrector 291 which generates a corrected image 292. In various implementations, the output of the second combiner 290 is the corrected image 292 and the device 250 does not include a third chromatic aberration corrector 281.

In various implementations, the device 250 includes the first chromatic aberration corrector 274 and the second chromatic aberration corrector 281, but does not include the third chromatic aberration corrector 291. In various implementations, the device 250 includes the first chromatic aberration 274 and the third chromatic aberration corrector 291, but does not includes the second chromatic aberration corrector 281. In various implementations, the device 250 includes the first chromatic aberration corrector 274, the second chromatic aberration corrector 281, and the third chromatic aberration corrector 291.

In various implementations, chromatic aberration correction is performed on a YCbCr image. The YCbCr image includes a matrix of pixels, each pixel associated with a luma value, a blue-chroma value, and a red-chroma value. In various implementations, the luma values range between 0 and 1, the blue-chroma values range between −0.5 and 0.5, and the red-chroma values range between −0.5 and 0.5.

In various implementation, chromatic aberration correction is performed on a per-pixel basis. Accordingly, chromatic aberration correction for a particular pixel is described further below.

FIG. 3 illustrates a neighborhood of pixels surrounding a pixel (p33) of a YCbCr image. The pixel (p33) includes a luma value of p33(Y), a blue-chroma value of p33($C_b$), and a red-chroma value of p33($C_r$).

Figure 4:
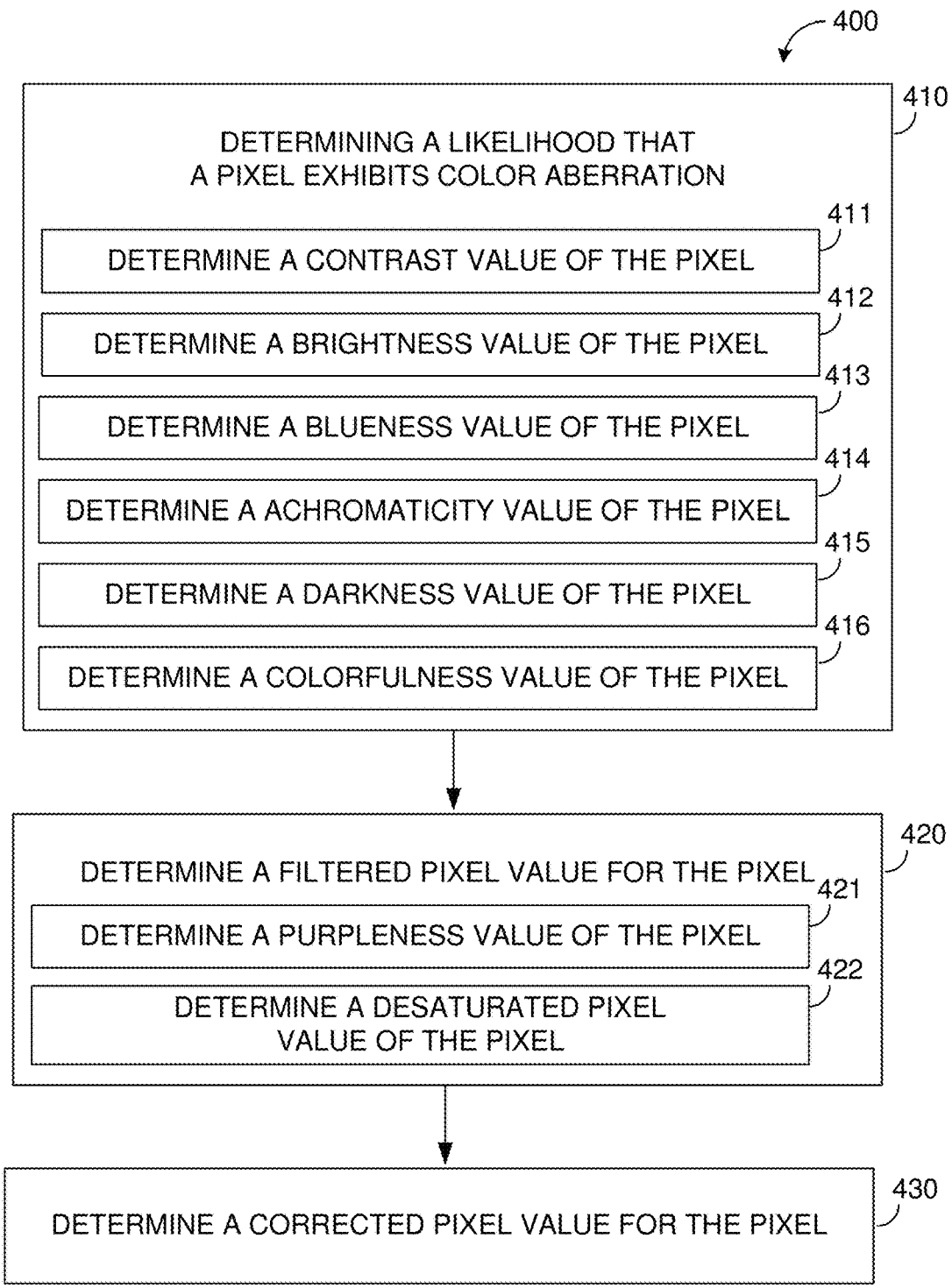
FIG. 4 illustrates a flowchart representation of a method of correcting chromatic aberration correction for a pixel.

FIG. 4 illustrates a flowchart representation of a method 400 of correcting chromatic aberration correction for a pixel. Pixels that exhibit chromatic aberration may be referred to as "fringe" pixels. The method 400 begins, in block 410 with determining a likelihood that the pixel exhibits chromatic aberration (or a likelihood that the pixel is a fringe pixel).

As previously noted, chromatic aberration results in false colors around the edges of objects. Accordingly, fringe pixels are commonly found in high-contrast regions, e.g., at an edge. Thus, to determine the likelihood that the pixel is a fringe pixel, the method 400 includes, in block 411, determining a contrast value for the pixel.

In various implementations, determining the contrast value includes determining the contrast (or luma gradient) of the pixel in a plurality of directions. For example, in various implementations, the horizontal contrast is determined as the difference between the luma values of the horizontally adjacent pixels. For example, referring to FIG. 3, the horizontal contrast for pixel p33 is determined as the absolute value of the difference between the luma value for pixel p32 and the luma value for pixel p34, e.g., |p32(Y)−p34(Y)|.

Similarly, in various implementations, the vertical contrast is determined as the difference between the luma values of the vertically adjacent pixels. For example, referring to FIG. 3, the vertical contrast for pixel p33 is determined as the absolute value of the difference between the luma value for pixel p23 and the luma value for pixel p43, e.g., |p23(Y)−p43(Y)|.

Further, in various implementations, a first diagonal contrast is determined as the difference between the luma values of the adjacent pixels in a first diagonal direction. For example, referring to FIG. 3, the first diagonal contrast for pixel p33 is determined as the absolute value of the difference between the luma value for pixel p24 and the luma value for pixel p42, e.g., |p24(Y)−p42(Y)|.

In various implementations, a second diagonal contrast is determined as the difference between the luma values of the adjacent pixels in a second diagonal direction. For example, referring to FIG. 3, the second diagonal contrast for pixel p33 is determined as the absolute value of the difference between the luma value for pixel p22 and the luma value for pixel p44, e.g., |p22(Y)−p44(Y)|.

In various implementations, the contrasts are determined using more than two adjacent pixels. For example, in various implementations, the horizontal contrast is determined by applying a filter subtracting the luma values of two or more pixels on the right side of the pixel from the luma values of two or more pixels on the left side of the pixel. For example, in various implementations, the filter is [1 1 0 −1 −1]. In various implementations, the filter is [1 1 1 0 −1 −1 −1]. In various implementations, the filter is [½ 1 0 −1 −½]. In various implementations, referring to FIG. 3, the horizontal contrast for pixel p33 is determined as |p31(Y)+p32(Y)−p34(Y)−p35(Y)|.

In various implementations, contrasts for additional diagonal directions (not at 45 degrees or 135 degrees) are determined. For example, in various implementations, referring to FIG. 3, a first diagonal contrast for pixel p33 is determined as |p15(Y)+p24(Y)−p42(Y)−p51(Y)| and a second diagonal contrast for pixel p33 is determined as $$\left| p14(Y) + \frac{p23(Y)+p24(Y)}{2} - \frac{p42(Y)+p43(Y)}{2} - p52(Y) \right|.$$

In various implementations, the contrast value for the pixel (determined in block 411) is the greatest of the contrasts in the plurality of directions. In various implementations, the direction of the greatest of the contrasts is also determined as a calculation direction. For example, referring to FIG. 3, the direction of the greatest contrast was the 135-degree direction. Thus, those pixels in that direction (e.g., p11, p22, p33, p44, and p55, shown in thicker outline) are selected for further calculation.

Fringe pixels are commonly found next to bright edges. Thus, to determine the likelihood that the pixel is a fringe pixel, the method 400 includes, in block 412, determining a brightness value for the pixel. In various implementations, the brightness value is not indicative of the brightness of the pixel itself, but indicative of the pixel's proximity to a bright pixel.

Thus, in various implementations, the brightness value is determined based on the luma values of nearby pixels. For example, referring to FIG. 3, in various implementations, the brightness value for pixel p33 is determined as the greater luma value of the two pixels adjacent to the pixel p33 in the calculation direction, e.g., max(p22(Y), p44(Y)). As another example, referring to FIG. 3, in various implementations, the brightness value of pixel p33 is determined as the greatest luma value of the four pixels near pixel p33 in the calculation direction, e.g., max(p11(Y), p22(Y), p44(Y), p55(Y)). As another example, referring to FIG. 3, in various implementations, the brightness value of pixel p33 is determined as the greater average luma value of the pixels on either side of the pixel p33 in the calculation direction, e.g., max $$\left( \frac{p11(Y)+p22(Y)}{2}, \frac{p44(Y)+p55(Y)}{2} \right).$$

In various implementations, the side of the pixel (in the determined direction) of greater brightness is also determined as a calculation side. For example, referring to FIG. 3, the side of the greater brightness was the left side. Thus, those pixels on that side of the calculation direction (e.g., p11 and p22, shown with gray fill) are selected for further calculation.

Whereas fringe pixels are usually more noticeable around the high-contrast bright, e.g., over-exposed, edges, in some circumstances, e.g., a high-dynamic range image, fringes are noticeable around high-contrast blue edges, e.g., around patches of sky. Thus, to determine the likelihood that the pixel is a fringe pixel, the method 400 includes, in block 413, determining a blueness value for the pixel. In various implementations, the blueness value is not indicative of the blueness of the pixel itself, but indicative of the pixel's proximity to a bright blue pixel.

Thus, in various implementations, the blueness value is determined based on the blue-chroma values of nearby pixels. For example, referring to FIG. 3, in various implementations, the blueness value for pixel p33 is determined as the blue-chroma value of the pixel adjacent to the pixel p33 in the calculation direction on the calculation side, e.g., p22($C_b$). As another example, referring to FIG. 3, in various implementations, the blueness value of pixel p33 is determined as the maximum or average value of the two pixels in the calculation direction on the calculation side, e.g., max(p11($C_b$), p22($C_b$)) or $$\frac{p11(C_b) + p22(C_b)}{2}.$$

As noted above, fringe pixels are usually more noticeable around the high-contrast bright, e.g., over-exposed, edges. Such edges tend to be achromatic, e.g., as a result of being over-exposed. Thus, to determine the likelihood that the pixel is a fringe pixel, the method 400 includes, in block 414, determining an achromaticity value for the pixel. In various implementations, the achromaticity value is not indicative of the achromaticity of the pixel itself, but indicative of the pixel's proximity to a bright achromatic pixel.

In various implementations, to determine the achromaticity value, a blue chromaticity value and a red chromaticity value are determined. In various implementations, the blue chromaticity value is determined based on the blue-chroma values of nearby pixels and the red chromaticity value is determined based on the red-chroma values of nearby pixels. For example, referring to FIG. 3, in various implementations, the blue chromaticity value for pixel p33 is determined as the absolute value of the blue-chroma value of the pixel adjacent to the pixel p33 in the calculation direction on the calculation side, e.g., |p22($C_b$)| and the red chromaticity value for pixel p33 is determined as the absolute value of the red-chroma value of the pixel adjacent to the pixel p33 in the calculation direction on the calculation side, e.g., |p22($C_r$)|. As another example, referring to FIG. 3, in various implementations, the blue chromaticity value of pixel p33 is determined as the minimum or average of the absolute value of the blue-chroma value of the two pixels in the calculation direction on the calculation side, e.g., min(|p11($C_b$)|, |p22($C_b$)|) or $$\frac{|p11(C_b)| + |p22(C_b)|}{2}$$

and the red chromaticity value of pixel p33 is determined as the minimum or average of the absolute value of the red-chroma value of the two pixels in the calculation direction on the calculation side, e.g., min(|p11($C_r$)|, |p22($C_r$)|) or $$\frac{|p11(C_r)| + |p22(C_r)|}{2}.$$

In various implementations, the achromaticity value is determined as the product of (a) one minus the blue chromaticity value and (b) one minus the red chromaticity value.

In addition to being near bright pixels, fringe pixels are generally darker than the bright pixels to which they are near. Thus, to determine the likelihood that the pixel is a fringe pixel, the method 400 includes, in block 415, determining a darkness value for the pixel. In various implementations, the darkness value is indicative of the luminance (or lack thereof) of the pixel as compared to nearby pixels.

For example, referring to FIG. 3, in various implementations, the darkness for pixel p33 is determined as the difference between the luma value of the brightest pixel in the calculation direction on the calculation side and the luma value of the pixel p33, e.g., max(p11(Y)−p33(Y), p22(Y)−p33(Y)) or, equivalently, max(p11(Y), p22(Y))−p33(Y).

Although fringe pixels are generally dark pixels in a high-contrast region near bright, achromatic pixels, not all pixels that meet these criteria are fringe pixels. In particular, the neighborhood around a fringe pixel usually contains a few colorful pixels (fringed pixels) and some achromatic ones. If in a neighborhood, many colorful pixels are detected, that region is likely not to suffer from chromatic aberration. Thus, to determine the likelihood that the pixel is a fringe pixel, the method 400 includes, in block 416, determining a colorfulness value for the pixel. In various implementations, the colorfulness value is not indicative of the colorfulness of the pixel, but the colorfulness of the neighborhood surrounding the pixel.

Each pixel in a neighborhood surrounding the pixel is classified as either colorful or not colorful. In various implementations, a pixel is classified as colorful if either the absolute value of the blue-chroma value is greater than a blue-chroma threshold or the absolute value of red-chroma value is greater than a red-chroma threshold. The blue-chroma threshold and the red-chroma threshold may be the same or different. For example, in various implementations, the blue-chroma threshold or the red-chroma threshold is 0.25 or 0.5.

In various implementations, the colorfulness value is the number of colorful pixels in the neighborhood divided by the size of the neighborhood. For example, referring to FIG. 3, 12 pixels are classified as colorful and the colorfulness value is 12/25.

In various implementations, using colorfulness to determine the likelihood that the pixel exhibits chromatic aberration decreases the correction strength for fringed pixels next to blue sky, because in those regions almost all pixels are colorful. Thus, in various implementations, the colorfulness value is decreased in regions where there are at least a threshold number of bright, blue pixels.

In various implementations, the likelihood that a pixel exhibits chromatic aberration is determined (in block 410) based on one or more of the contrast value (determined in block 411), the brightness value (determined in block 412), the blueness value (determined in block 413), the achromaticity value (determined in block 414), the darkness value (determined in block 415), and the colorfulness value (determined in block 416).

In various implementations, each of the various values are normalized according to a respective normalization function which takes, as an input, the value, and produces, as an output, a normalized value which ranges from 0 to 1. In various implementations, each normalization function is 0 for input values less than a first threshold (T1) and is 1 for input values greater than a second threshold (T2). In various implementations, between the first threshold and the second threshold, each normalization function is non-decreasing. In various implementations, the respective normalization functions have different thresholds for different values, e.g., the thresholds for the brightness value are different than the thresholds for the achromaticity value.

Figure 5A:
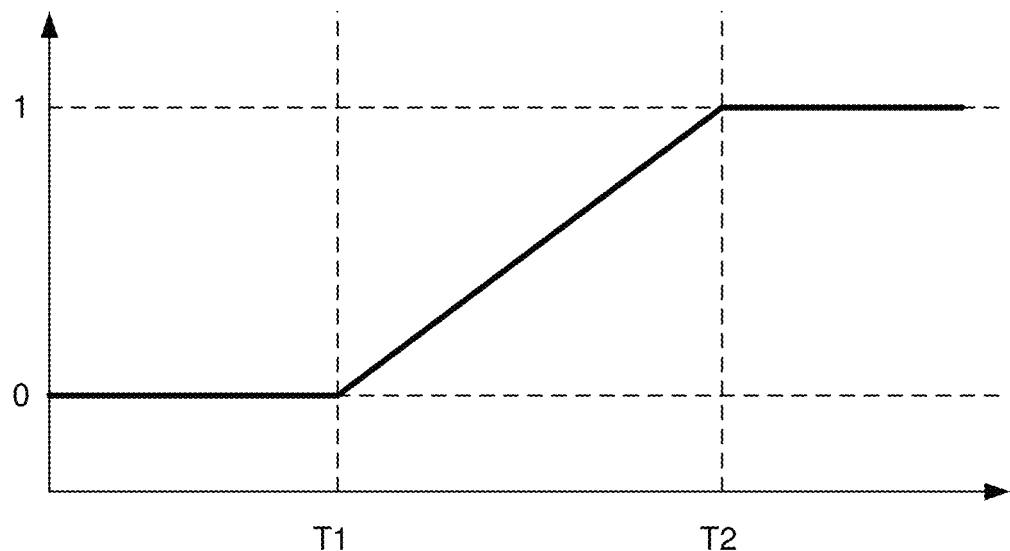
FIG. 5A illustrates a plot of a first normalization function.

FIG. 5A illustrates a plot of a first normalization function. The first normalization function is piecewise linear, 0 below a first threshold (T1), 1 above a second threshold (T2), and linearly varying between the first threshold and the second threshold.

Figure 5B:
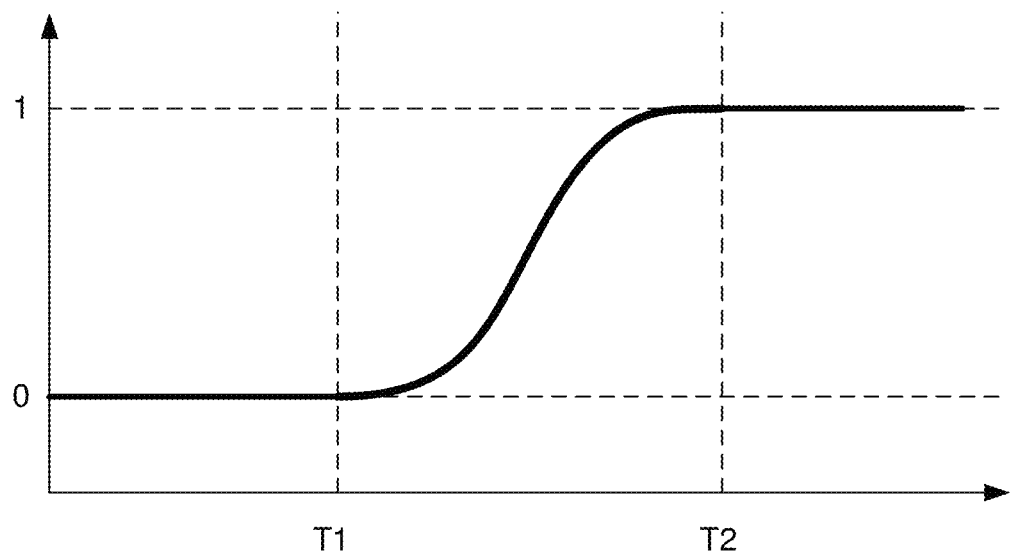
FIG. 5B illustrates a plot of a second normalization function.

FIG. 5B illustrates a plot of a second normalization function. The second normalization function is 0 below a first threshold (T1), 1 above a second threshold (T2), and a sigmoid function between the first threshold and the second threshold.

In various implementations, the likelihood that a pixel exhibits chromatic aberration is determined as the product of at least some of the normalized values. In various implementations, the normalized brightness value and normalized blueness value are combined into a normalized bright-blue value. In various implementations, the bright-blue value is either 1 or the normalized brightness value plus the normalized blueness value, whichever is less, e.g., normalized bright-blue value=min(1, normalized brightness value+normalized blueness value).

In various implementations, the likelihood that a pixel exhibits chromatic aberration is determined as the normalized contrast value times the normalized bright-blue value times the normalized achromaticity value times the normalized darkness value times one minus the normalized colorfulness value.

The method 400 continues, in block 420, with determining a filtered pixel value for the pixel. In various implementations, the filtered pixel value is determined by applying a locally adaptive low-pass filter to the blue-chroma channel and the red-chroma channel Thus, the filtered pixel value includes a luma value (equal to the luma value of the pixel), a blue-chroma value (from filtering the blue-chroma channel), and a red-chroma value (for filtering the red-chroma channel).

In various implementations, where C(i,j) is the chroma value (either blue or red) of a pixel at location (i,j), $w_{i,j}$ are the adaptive coefficients of a filter, and $C_f(i,j)$ is the filtered chroma value (either blue or red), $$C_f(i, j) = \frac{\sum_{k,l} C(i+k, j+l) w_{i,j}(k, l)}{\sum_{k,l} w_{i,j}(k, l)}.$$

In various implementations, the adaptive coefficients for each pixel in the neighborhood surrounding the particular pixel being filtered are inversely proportional to the likelihood that the pixel in the neighborhood exhibits chromatic aberration. Thus, pixels with false color will not contribute strongly to the output of the filtering.

In various implementations, more strongly weighting pixels in the neighborhood surrounding the particular pixel being filtered that are darker than the particular pixel results in visually pleasing images without halo artifacts. Thus, in various implementations, the adaptive coefficients are set to 1 for pixels that are darker than the particular pixel and 0 for pixels that are not darker than the particular pixel.

Thus, where Y(i,j) is the luma value of the pixel at location (i,j), and [Y(i+k,j+l)<Y(i,j)] is a binary operator that is 1 if Y(i+k,j+l)<Y(i,j) and 0 otherwise, in various implementations, the filtered chroma value is $$C_f(i, j) = \frac{\sum_{k,l} C(i+k, j+l)[Y(i+k, j+l) < Y(i, j)]}{\sum_{k,l} [Y(i+k, j+l) < Y(i, j)]}.$$

Applying a low-pass filter to determine the filtered pixel value for the pixel has the effect of replacing the color of a pixel exhibiting chromatic aberration with the color of its neighbors. However, if those pixels also exhibit chromatic aberration, such replacement is insufficient to mitigate the chromatic aberration.

In various implementations, chromatic aberration that effects large groups of pixels is noticeably purple. Thus, in various implementations, determining the filtered pixel value includes, in block 421, determining a purpleness value of the pixel.

In the CbCr space, purple is generally at 45 degrees. Accordingly, in various implementations, the purpleness value is indicative of how close the CbCr angle of the pixel is to 45 degrees. In various implementations, the purpleness value, p, is determined as, where $\theta_c$ is the pixel's chroma angle, $C_b$ is the pixel's blue-chroma value, and $C_r$ is the pixel's red-chroma value:

$$p = \cos(\theta_c)\sin(\theta_c) = \frac{c_b \times c_r}{c_b^2 + c_r^2}, \text{ if } C_b > 0 \text{ and } C_r > 0, \text{ and } 0 \text{ otherwise.}$$

In various implementations, the purpleness value is normalized according to a normalization function, such as one of those illustrated in FIGS. 5A and 5B, which takes, as an input, the value, and produces, as an output, a normalized value which ranges from 0 to 1. In various implementations, the normalization function is 0 for input values less than a first threshold (T1) and is 1 for input values greater than a second threshold (T2).

In various implementations, the purpleness value is used to determine a desaturated pixel value for the pixel. The desaturated pixel value includes a luma value (equal to the luma value of the pixel), a desaturated blue-chroma value, and a desaturated red-chroma value. In various implementations, the desaturated blue-chroma value is determined as $(1-p)C_b$ and the desaturated red-chroma value is determined as $(1-p)C_r$.

In various implementations, the filtered pixel value (determined in block 420) is a weighted sum of the filtered pixel value as determined above and the desaturated pixel value.

The method 400 continues, in block 430, with determining a corrected pixel value for the pixel. The corrected pixel value includes a luma value (equal to the luma value of the pixel), a corrected blue-chroma value, and a corrected red-chroma value.

In various implementations, the corrected blue-chroma value is a weighted sum of the blue-chroma value of the filtered pixel value (which may itself be a weighted sum of a filtered pixel value and a desaturated pixel value) and the blue-chroma value of the pixel. In various implementations, the sum is weighted by the likelihood that the pixel exhibits chromatic aberration (as determined in block 410).

Thus, where M is the likelihood that the pixel exhibits chromatic aberration, $C_b$ is the original blue-chroma value of the pixel, $C_{bf}$ is the blue-chroma value of the filtered pixel value, in various implementations, the corrected blue-chroma value is determined as $M \times C_{bf} + (1-M)C_b$.

Similarly, in various implementations, the corrected red-chroma value is a weighted sum of the red-chroma value of the filtered pixel value (which may itself be a weighted sum of a filtered pixel value and a desaturated pixel value) and the red-chroma value of the pixel. In various implementations, the sum is weighted by the likelihood that the pixel exhibits chromatic aberration (as determined in block 410).

Thus, where M is the likelihood that the pixel exhibits chromatic aberration, $C_r$ is the original blue-chroma value of the pixel, $C_{rf}$ is the blue-chroma value of the filtered pixel value, in various implementations, the corrected red-chroma value is determined as $$M \times C_{rf} + (1-M)C_r.$$

By performing the method 400 for each pixel of an image, a corrected image is generated, the corrected image includes a matrix of pixels, each pixel having the corresponding corrected pixel value.

Figure 6:
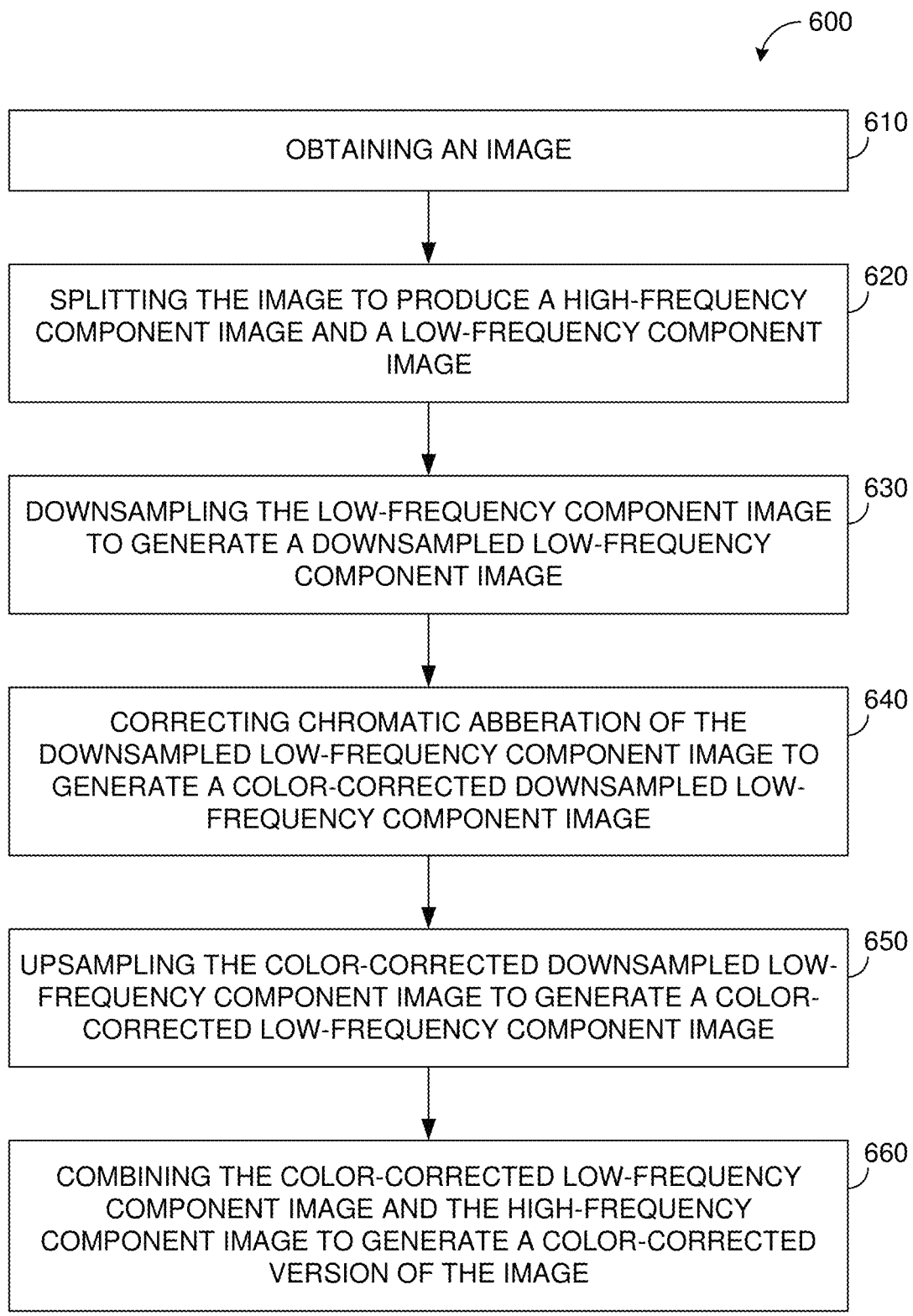
FIG. 6 is a flowchart representation of a method of correcting chromatic aberration in an image using multiple bands in accordance with some implementations.

FIG. 6 is a flowchart representation of a method 600 of correcting chromatic aberration in an image using multiple bands in accordance with some implementations. In various implementations, the method 600 is performed by a device with one or more processors and non-transitory memory. In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device obtaining an image. For example, in FIG. 2A, the two-band color correcting device 200 obtains the image 201. In various implementations, obtaining the image includes splitting a primary image to produce a high-frequency component primary image and low-frequency component primary image and downsampling the low-frequency component image to generate the image. For example, in FIG. 2B, the three-band chromatic aberration correcting device 250 splits the image 251 using the first splitter 260 and downsamples the low-frequency portion thereof using the first downs ampler 271, thereby obtaining an image.

In various implementations, the image includes multiple channels, each channel including a matrix of pixels. For example, in various implementations, the image is an RGB image and includes a red channel, a green channel, and a blue channel. As another example, in various implementations, the image is a YCbCr image and includes a luma channel, a blue-chroma channel, and a red-chroma channel.

The method 600 continues, in block 620, with the device spiting the image to produce a high-frequency component image and a low-frequency component image. For example, in FIG. 2A, the two-band chromatic aberration correcting device 200 splits the image 201 using the splitter 210 to produce a low-frequency portion and high-frequency portion thereof.

The method 600 continues, in block 630, with the device downsampling the low-frequency component image to generate a downsampled low-frequency component image. For example, in FIG. 2A, the two-band chromatic aberration correcting device 200 downsamples the low-frequency portion of the image 201 using the downs ampler 221. In various implementations, the low-frequency component image is downsampled by a factor of two (both horizontally and vertically).

The method 600 continues, in block 640, with the device correcting chromatic aberration of the downsampled low-frequency component image to generate a color-corrected downsampled low-frequency component image. In various implementations, the device corrects chromatic aberration of the downsampled low-frequency component image using any of the methods described above with respect to FIG. 4 or described below with respect to FIG. 7.

In various implementations, correcting chromatic aberration of the downsampled low-frequency component image includes, for a particular pixel of the downsampled low-frequency component image, determining a likelihood that the particular pixel exhibits chromatic aberration. In various implementations, the device determines the likelihood that the particular pixel exhibits chromatic aberration using any of the methods described above with respect to block 410 of FIG. 4 or described below with respect to block 722 of FIG. 7. In various implementations, the likelihood that the particular pixel exhibits chromatic aberration is a value between 0 and 1.

In various implementations, determining the likelihood that the particular pixel exhibits chromatic aberration is based on a contrast value for the particular pixel. In various implementations, determining the likelihood that the particular pixel exhibits chromatic aberration is based on a brightness value for the particular pixel. In various implementations, determining the likelihood that the particular pixel exhibits chromatic aberration is based on one or more chromatic characteristic values for the particular pixel. Each chromatic characteristic value is based on at least one of the blue-chroma channel or the red-chroma channel. For example, whereas the contrast value and the brightness value are both based on the luma channel, chromatic characteristic values based on at least one of the blue-chroma channel or the red-chroma channel include a blueness value for the particular pixel, an achromaticity value of the particular pixel, and a colorfulness of the particular pixel.

In various implementations, correcting chromatic aberration of the downsampled low-frequency component image includes, for a particular pixel of the downsampled low-frequency component image, generating a filtered version of the particular pixel by filtering the particular pixel using a neighborhood of pixels surrounding the particular pixel and generating a color-corrected version of the particular pixel based on the likelihood that the particular pixel exhibits chromatic aberration and the filtered version of the pixel.

In various implementations, correcting chromatic aberration of the downsampled low-frequency component image includes, for a particular pixel of the downsampled low-frequency component image, determining a purpleness of the particular pixel and generating a desaturated version of the particular pixel by at least partially desaturating the particular pixel based on the purpleness of the particular pixel. In various implementations, generating the color-corrected version of the particular pixel is further based on the desaturated version of the particular pixel.

The method 600 continues, in block 650, with the device upsampling the color-corrected downsampled low-frequency component image to generate a color-corrected low-frequency component image. For example, in FIG. 2A, the two-band chromatic aberration correcting device 200 upsamples the output of the chromatic aberration corrector 222 using the upsampler 223. In various implementations, the color-corrected downsampled low-frequency component image is upsampled by a factor of two (both vertically and horizontally).

The method 600 continues, in block 660, with the device combining the color-corrected low-frequency component image and the high-frequency component image to generate a color-corrected version of the image. For example, in FIG. 2A, the two-band chromatic aberration correcting device 200 combines the corrected low-frequency portion of the image 201 and the high-frequency portion of the image 201 using the combiner 230 to produce the corrected image 241.

In various implementations, the method 600 further includes correcting chromatic aberration of the color-corrected version of the image e.g., using any of the methods described above with respect to FIG. 4 or block 640 or described below with respect to FIG. 7. For example, in FIG.

2A, in various implementations, the output of the combiner 240 is fed through the second chromatic aberration corrector 240. In various implementations, the method 600 does not include correcting chromatic aberration of the color-corrected version of the image. For example, in FIG. 2A, in various implementations, the two-band chromatic aberration correcting device 200 does not include the second chromatic aberration corrector 240.

In various implementations, the method 600 further includes upsampling the color-corrected version of the image (with or without further chromatic aberration correction) to generate an upsampled color-corrected version of the image and combining the upsampled color-corrected version of the image and the high-frequency component primary image to generate a color-corrected version of the primary image. For example, in FIG. 2B, the three-band chromatic aberration correcting device 250 includes the second combiner 290 that combines the corrected low-frequency portion of the image 251 and the high-frequency portion of the image 251 to produce the corrected image 281. In various implementations, the method 600 further includes correcting chromatic aberration of the color-corrected version of the primary image e.g., using any of the methods described above with respect to FIG. 4 or block 640 or described below with respect to FIG. 7. For example, in FIG. 2B, in various implementations, the output of the second combiner 290 is fed through the third chromatic aberration corrector 291. In various implementations, the method 600 does not include correcting chromatic aberration of the color-corrected version of the primary image. For example, in FIG. 2B, in various implementations, the three-band chromatic aberration correcting device 250 does not include the third chromatic aberration corrector 291.

Figure 7:
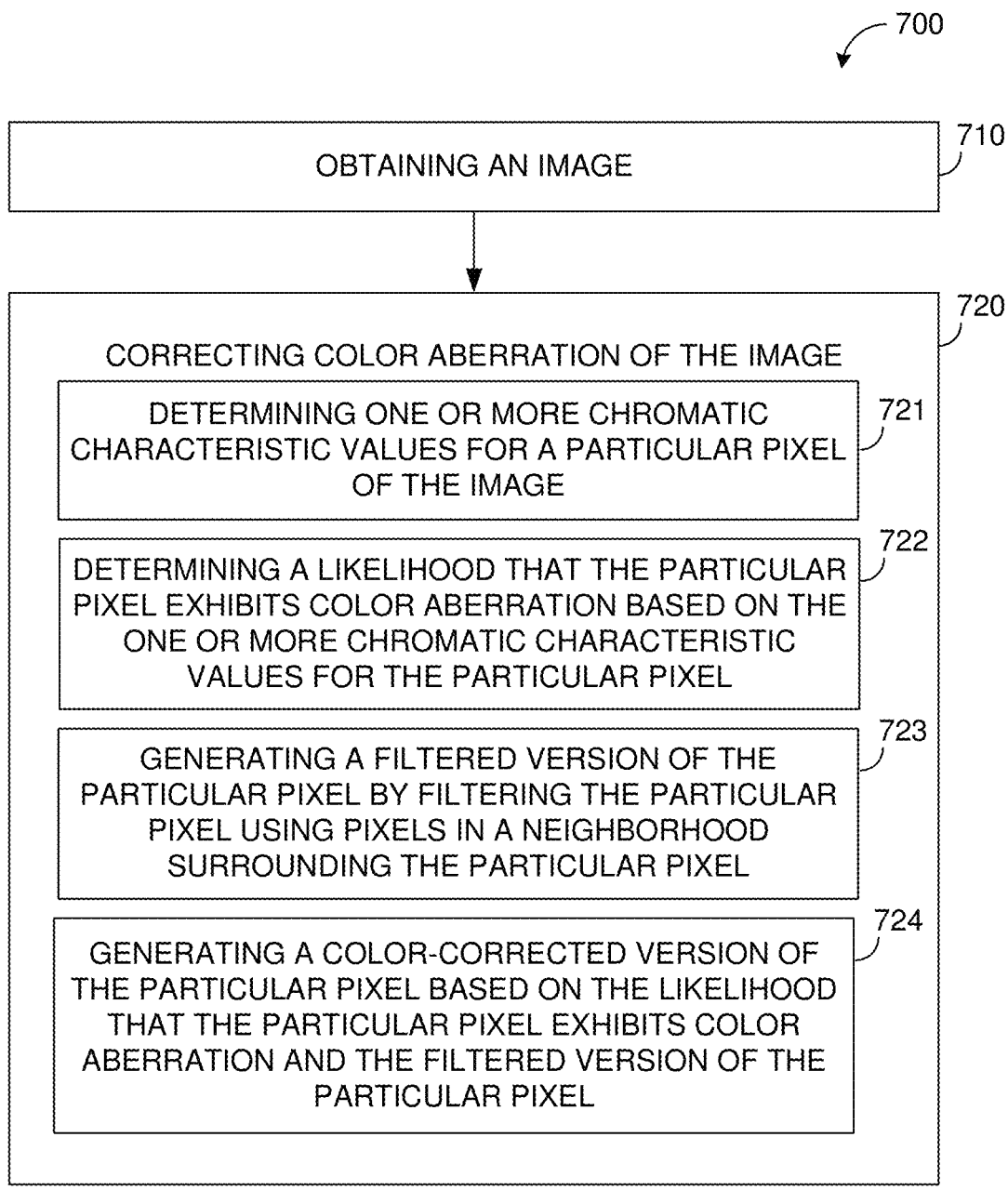
FIG. 7 is a flowchart representation of a method of correcting chromatic aberration in an image using one or more chromatic characteristic values in accordance with some implementations.

FIG. 7 is a flowchart representation of a method 700 of correcting chromatic aberration in an image using one or more chromatic characteristic values in accordance with some implementations. In various implementations, the method 700 is performed by a device with one or more processors and non-transitory memory. In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory).

The method 700 begins, in block 710, with the device obtaining an image. For example, in FIG. 2A, the two-band chromatic aberration correcting device 200 obtains the image 201. In various implementations, the image includes multiple channels, each channel including a matrix of pixels. For example, in various implementations, the image is an RGB image and includes a red channel, a green channel, and a blue channel. As another example, in various implementations, the image is a YCbCr image and includes a luma channel, a blue-chroma channel, and a red-chroma channel. In various implementations, the image is a YCbCr image including a matrix of pixels, each pixel having a luma value, a blue-chroma value, and a red-chroma value.

The method 700 continues, in block 720, with the device correcting chromatic aberration of the image. Correcting chromatic aberration of the image includes, in block 721, determining one or more chromatic characteristic values for a particular pixel of the image. Each chromatic characteristic value is based on at least one of the blue-chroma channel or the red-chroma channel. For example, whereas a contrast value and a brightness value are both based on the luma channel, chromatic characteristic values based on at least one of the blue-chroma channel or the red-chroma channel include a blueness value for the particular pixel, an achromaticity value of the particular pixel, and a colorfulness of the particular pixel.

In various implementations, correcting chromatic aberration of the image further comprises determining a contrast value for the particular pixel, wherein determining the likelihood that the particular pixel exhibits chromatic aberration is further based on the contrast value for the particular pixel.

In various implementations, determining the contrast value for the particular pixel includes determining a plurality of contrasts for the particular pixel in a plurality of directions and selecting, as the contrast value for the particular pixel, one of the plurality of contrasts. In various implementations, the contrast value is selected as the greatest of the plurality of contrasts. For example, with respect to FIG. 3, a horizontal contrast and a vertical contrast are determined as $|p32(Y)-p34(Y)|$ and $|p23(Y)-p43(Y)|$, respectively.

In various implementations, the plurality of contrasts includes at least one diagonal contrast. For example, with respect to FIG. 3, a first diagonal contrast and a second diagonal contrast are determined as $|p24(Y)-p42(Y)|$ and $|p22(Y)-p44(Y)|$, respectively.

In various implementations, determining the plurality of contrasts for the particular pixel in a plurality of directions is performed using pixels in a neighborhood of a first size surrounding the particular pixel. For example, with respect to FIG. 3, a 3×3 neighborhood surrounding the particular pixel is used to determine a plurality of contrasts. In various implementations, the method 700 includes selecting, as a calculation direction, one of the plurality of directions corresponding to the selected one of the plurality of contrasts. For example, with respect to FIG. 3, the second diagonal direction is selected as a calculation direction. In various implementations, determining the one or more chromatic characteristic values of the particular pixel (or one or more other characteristic values of the particular pixel on which the likelihood that the particular pixel exhibits chromatic aberration is based) is based on the pixels in the neighborhood of the first size in the calculation direction (e.g., p22, p33, and p44) and based on pixels in a neighborhood of a second size, greater than the first size, in the calculation direction (e.g., a 5×5 neighborhood, thus encompassing p11 and p55).

In various implementations, the pixels in the neighborhood of the first size are loaded into a buffer. Then, when the calculation direction is determined, only those pixels in the calculation direction in the neighborhood of the second size are loaded into the buffer. In various implementations, the second size is determined based on the distance from the center of the image to the particular pixel. Thus, if the neighborhood of the first size is 3×3, nine pixels are loaded into the buffer. If the neighborhood of the second size is 5×5, two additional pixels are loaded into the buffer, not 16 additional pixels.

In various implementations, correcting chromatic aberration of the image further comprises determining a brightness value for the particular pixel, wherein determining the likelihood that the particular pixel exhibits chromatic aberration is further based on the brightness value for the particular pixel. In various implementations, the brightness value is determined based on the luma values of nearby pixels. For example, referring to FIG. 3, in various implementations, the brightness value for pixel p33 is determined as the greater luma value of the two pixels adjacent to the pixel p33 in the calculation direction, e.g., max(p22(Y), p44(Y)). As another example, referring to FIG. 3, in various implementations, the brightness value of pixel p33 is determined as the greatest luma value of the four pixels near pixel p33 in the calculation direction, e.g., max(p11(Y), p22(Y), p44(Y), p55(Y)). As another example, referring to FIG. 3, in various implementations, the brightness value of pixel p33 is determined as the greater average luma value of the pixels on either side of the pixel p33 in the calculation direction, e.g., max $$\left(\frac{p11(Y)+p22(Y)}{2},\frac{p44(Y)+p55(Y)}{2}\right).$$

In various implementations, the side of the pixel (in the calculation direction) of greater brightness is also determined as a calculation side. For example, with respect to FIG. 3, the side of the greater brightness was the left side. Thus, those pixels on that side of the calculation direction (e.g., p11 and p22, shown with gray fill) are selected for further calculation.

In various implementations, correcting chromatic aberration of the image further comprises determining a darkness value for the particular pixel, wherein determining the likelihood that the particular pixel exhibits chromatic aberration is further based on the darkness value for the particular pixel. For example, referring to FIG. 3, in various implementations, the darkness for pixel p33 is determined as the difference between the luma value of the brightest pixel in the calculation direction on the calculation side and the luma value of the pixel p33, e.g., max(p11(Y)−p33(Y), p22(Y)−p33(Y)) or, equivalently, max(p11(Y),p22(Y))−p33(Y).

In various implementations, determining the one or more chromatic characteristic values for the particular pixel comprises determining a blueness value for the particular pixel based on blue-chroma values of pixels in the neighborhood surrounding the particular pixel. For example, with respect to FIG. 3, in various implementations, the blueness value for pixel p33 is determined as the blue-chroma value of the pixel adjacent to the pixel p33 in the calculation direction on the calculation side, e.g., p22($C_b$). As another example, referring to FIG. 3, in various implementations, the blueness value of pixel p33 is determined as the maximum or average value of the two pixels in the calculation direction on the calculation side, e.g., max(p11($C_b$),p22($C_b$)) or $$\frac{p11(C_b)+p22(C_b)}{2}.$$

In various implementations, determining the one or more chromatic characteristic values for the particular pixel comprises determining an achromaticity value for the particular pixel based on blue-chroma values and red-chroma values of pixels in the neighborhood of pixels surrounding the particular pixel. In various implementations, to determine the achromaticity value, a blue chromaticity value and a red chromaticity value are determined. In various implementations, the blue chromaticity value is determined based on the blue-chroma values of nearby pixels and the red chromaticity value is determined based on the red-chroma values of nearby pixels. For example, referring to FIG. 3, in various implementations, the blue chromaticity value for pixel p33 is determined as the absolute value of the blue-chroma value of the pixel adjacent to the pixel p33 in the calculation direction on the calculation side, e.g., |p22($C_b$)| and the red chromaticity value for pixel p33 is determined as the absolute value of the red-chroma value of the pixel adjacent to the pixel p33 in the calculation direction on the calculation side, e.g., |p22($C_r$)|. As another example, referring to FIG. 3, in various implementations, the blue chromaticity value of pixel p33 is determined as the minimum or average of the absolute value of the blue-chroma value of the two pixels in the calculation direction on the calculation side, e.g., min (|p11($C_b$)|, |p22($C_b$)|) or $$\frac{|p11(C_b)|+|p22(C_b)|}{2}$$

and the red chromaticity value of pixel p33 is determined as the minimum or average of the absolute value of the red-chroma value of the two pixels in the calculation direction on the calculation side, e.g., min(|p11($C_r$)|, |p22($C_r$)|) or $$\frac{|p11(C_r)|+|p22(C_r)|}{2}.$$

In various implementations, the achromaticity value is determined as the product of (a) one minus the blue chromaticity value and (b) one minus the red chromaticity value.

In various implementations, determining the one or more chromatic characteristic values for the particular pixel comprises determining a colorfulness value for the particular pixel based on a number of pixels in the neighborhood of pixels surrounding the particular pixel having absolute blue-chroma values above a blue-chroma threshold or absolute red-chroma values above a red-chroma threshold. In various implementations, determining the colorfulness value includes classifying each pixel in the neighborhood surrounding the particular pixel as either colorful or not colorful. In various implementations, a pixel is classified as colorful if either the absolute value of the blue-chroma value is greater than a blue-chroma threshold or the absolute value of red-chroma value is greater than a red-chroma threshold. The blue-chroma threshold and the red-chroma threshold may be the same or different. For example, in various implementations, the blue-chroma threshold or the red-chroma threshold is 0.25 or 0.5.

In various implementations, the colorfulness value is the number of colorful pixels in the neighborhood divided by the size of the neighborhood. For example, with respect to FIG. 3, 12 pixels are classified as colorful and the colorfulness value is 12/25.

In various implementations, determining the one or more chromatic characteristic values for the particular pixel comprises determining one or more unnormalized chromatic characteristic values for the particular pixel and applying a respective mapping function to each of the one or more unnormalized chromatic characteristic values to determine the one or more chromatic characteristic values for the particular pixel, each respective mapping function having outputs between 0 and 1. In various implementations, the respective mapping functions are different from each other. FIGS. 5A and 5B illustrate two example mapping functions.

Correcting chromatic aberration of the image includes, in block 722, determining a likelihood that the particular pixel exhibits chromatic aberration based on the one or more chromatic characteristic values for the particular pixel. In various implementations, the likelihood that the particular pixel exhibits chromatic aberration is based on a product of one or more of the following: one minus the colorfulness value, the achromaticity value, the contrast value, the darkness value, and the minimum of one or the sum of the brightness value and the blueness value.

Correcting chromatic aberration of the image includes, in block 723, generating a filtered version of the particular pixel by filtering the particular pixel using pixels in a neighborhood surrounding the particular pixel. In various implementations, a low-pass filter is applied.

Correcting chromatic aberration of the image includes, in block 724, generating a color-corrected version of the particular pixel based on the likelihood that the particular pixel exhibits chromatic aberration and the filtered version of the particular pixel. In various implementations, the color-corrected version of the particular pixel is a weighted (by the likelihood) sum of the particular pixel and the filtered version of the pixel.

In various implementations, correcting chromatic aberration of the image further includes determining a purpleness of the particular pixel based on a blue-chroma value and a red-chroma value of the particular pixel and generating a desaturated version of the particular pixel by at least partially desaturating the particular pixel based on the purpleness of the particular pixel. In various implementations, the purpleness value, p, is determined as, where $\theta_c$ is the pixel's chroma angle, $C_b$ is the pixel's blue-chroma value, and $C_r$ is the pixel's red-chroma value:

$$p = \cos(\theta_c)\sin(\theta_c) = \frac{c_b \times c_r}{c_b^2 + c_r^2}, \text{ if } C_b > 0 \text{ and } C_r > 0, \text{ and } 0 \text{ otherwise.}$$

In various implementations, generating the color-corrected version of the particular pixel is further based on desaturated version of the particular pixel. In various implementations, the color-corrected version of the particular pixel is a weighted (based on the likelihood) sum of the particular pixel, the filtered version of the particular pixel, and the desaturated version of the particular pixel.

Figure 8:
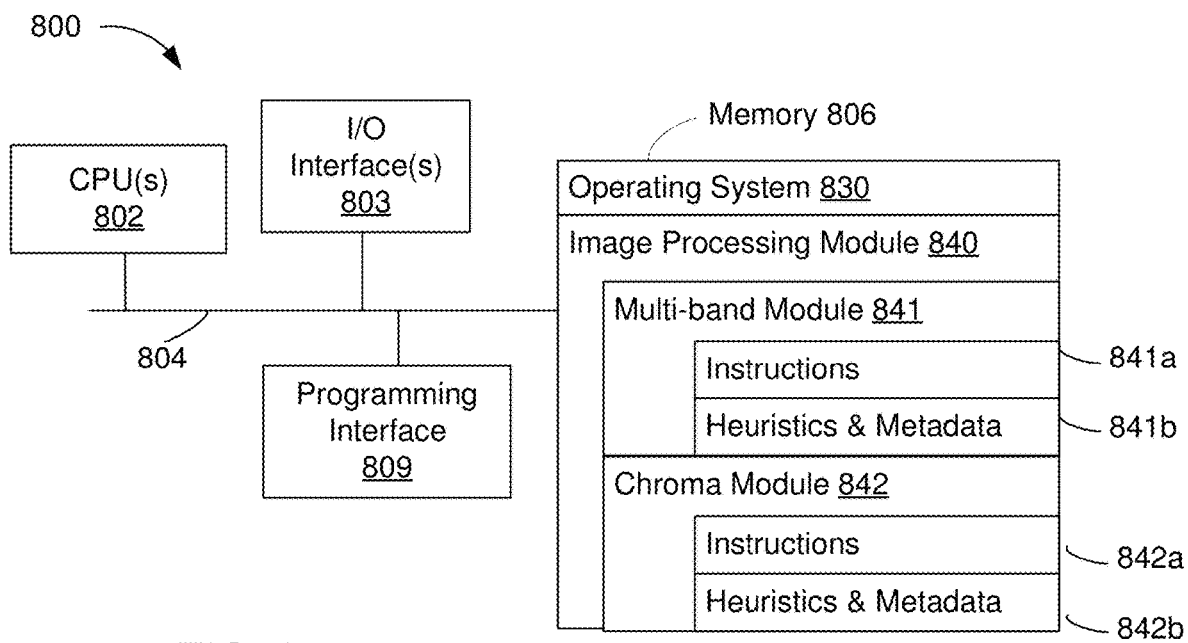
FIG. 8 is a block diagram of a computing device in accordance with some implementations.

FIG. 8 is a block diagram of a computing device 800 in accordance with some implementations. In some implementations, the computing device 800 corresponds to at least a portion of the two-band chromatic aberration correcting device 200 of FIG. 2A or the three-band chromatic aberration correcting device 250 of FIG. 2B and performs one or more of the functionalities described above with respect to those devices. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the computing device 800 includes one or more processing units (CPUs) 802 (e.g., processors), one or more input/output interfaces 803 (e.g., a network interface and/or a sensor interface), a memory 806, a programming interface 809, and one or more communication buses 804 for interconnecting these and various other components.

In some implementations, the one or more communication buses 804 include circuitry that interconnects and controls communications between system components. The memory 806 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 806 optionally includes one or more storage devices remotely located from the one or more CPUs 802. The memory 806 comprises a non-transitory computer readable storage medium. Moreover, in some implementations, the memory 806 or the non-transitory computer readable storage medium of the memory 806 stores the following programs, modules and data structures, or a subset thereof including an optional operating system 830 and an image processing module 840. In some implementations, one or more instructions are included in a combination of logic and non-transitory memory. The operating system 830 includes procedures for handling various basic system services and for performing hardware dependent tasks. In some implementations, the image processing module 840 is configured to correct chromatic aberration of an image. To that end, the image processing module 840 includes a multi-band module 841 and a chroma module 842.

In some implementations, the multi-band module 841 is configured to split an image into a high-frequency component and a low-frequency component, downsample the low-frequency component and provide the result to the chroma module 842. The multi-band module 841 is further configured to receive a color-corrected result from the chroma module 842, upsample the color-corrected result, and combine the upsampled image with the low-frequency component. To that end, the multi-band module 841 includes a set of instructions 841a and heuristics and metadata 841b.

In some implementations, the chroma module 842 is configured to correct chromatic aberration of an image using one or more chromatic characteristic values. To that end, the chroma module 842 includes a set of instructions 842a and heuristics and metadata 842b.

Although the image processing module 840, the multi-band module 841, and the chroma module 842 are illustrated as residing on a single computing device 800, it should be understood that in other implementations, any combination of the image processing module 840, the multi-band module 841, and the chroma module 842 can reside in separate computing devices in various implementations. For example, in some implementations each of the image processing module 840, the multi-band module 841, and the chroma module 842 reside on a separate computing device or in the cloud.

Moreover, FIG. 8 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one implementation to another, and may depend in part on the particular combination of hardware, software and/or firmware chosen for a particular implementation.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs or GP-GPUs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of correcting chromatic aberration in an image, the method comprising:
    obtaining the image;
    splitting the image to produce a high-frequency component image and a low-frequency component image;
    downsampling the low-frequency component image to generate a downsampled low-frequency component image;
    correcting chromatic aberration of the downsampled low-frequency component image to generate a color-corrected downsampled low-frequency component image;
    upsampling the color-corrected downsampled low-frequency component image to generate a color-corrected low-frequency component image; and
    combining the color-corrected low-frequency component image and the high-frequency component image to generate a color-corrected version of the image.

2. The method of claim 1, further comprising correcting chromatic aberration of the color-corrected version of the image.

3. The method of claim 1, wherein obtaining the image includes:
    splitting a primary image to produce a high-frequency component primary image and a low-frequency component primary image; and
    downsampling the low-frequency component image to generate the image.

4. The method of claim 3, further comprising:
    upsampling the color-corrected version of the image to generate an upsampled color-corrected version of the image; and
    combining the upsampled color-corrected version of the image and the high-frequency component primary image to generate a color-corrected version of the primary image.

5. The method of claim 4, further comprising correcting chromatic aberration of the color-corrected version of the primary image.

6. The method of claim 1, wherein the image is a YCrCb image.

7. The method of claim 1, wherein correcting chromatic aberration of the downsampled low-frequency component image includes, for a particular pixel of the downsampled low-frequency component image:
    determining a likelihood that the particular pixel exhibits chromatic aberration.

8. The method of claim 7, wherein determining the likelihood that the particular pixel exhibits chromatic aberration is based on one or more chromatic characteristic values for the particular pixel.

9. The method of claim 7, wherein correcting chromatic aberration of the downsampled low-frequency component image includes, for a particular pixel of the downsampled low-frequency component image:
    generating a filtered version of the particular pixel by filtering the particular pixel using a neighborhood of pixels surrounding the particular pixel; and
    generating a color-corrected version of the particular pixel based on the likelihood that the particular pixel exhibits chromatic aberration and the filtered version of the pixel.

10. The method of claim 9, wherein correcting chromatic aberration of the downsampled low-frequency component image includes, for a particular pixel of the downsampled low-frequency component image:
    determining a purpleness of the particular pixel; and
    generating a desaturated version of the particular pixel by at least partially desaturating the particular pixel based on the purpleness of the particular pixel,
    wherein generating the color-corrected version of the particular pixel is further based on the desaturated version of the particular pixel.

11. An electronic device comprising:
    a non-transitory memory; and
    one or more processors configured to:
        obtain an image;
        split the image to produce a high-frequency component image and a low-frequency component image;
        downsample the low-frequency component image to generate a downsampled low-frequency component image;

correct chromatic aberration of the downsampled low-frequency component image to generate a color-corrected downsampled low-frequency component image;

upsample the color-corrected downsampled low-frequency component image to generate a color-corrected low-frequency component image; and combine the color-corrected low-frequency component image and the high-frequency component image to generate a color-corrected version of the image.

12. The electronic device of claim 11, wherein the one or more processors are further configured to correct chromatic aberration of the color-corrected version of the image.

13. The electronic device of claim 11, wherein the one or more processors are configured to obtain the image by:

splitting a primary image to produce a high-frequency component primary image and low-frequency component primary image; and downsample the low-frequency component image to generate the image.

14. The electronic device of claim 13, wherein the one or more processors are further configured to:

upsample the color-corrected version of the image to generate an upsampled color-corrected version of the image; and combine the upsampled color-corrected version of the image and the high-frequency component primary image to generate a color-corrected version of the primary image.

15. The electronic device of claim 14, wherein the one or more processors are further configured to correct chromatic aberration of the color-corrected version of the primary image.

16. The electronic device of claim 11, wherein the one or more processors are configured to correct chromatic aberration of the downsampled low-frequency component image by, for a particular pixel of the downsampled low-frequency component image:

determining a likelihood that the particular pixel exhibits chromatic aberration.

17. The electronic device of claim 16, wherein the one or more processors are configured to determine the likelihood that the particular pixel exhibits chromatic aberration based on one or more chromatic characteristic values for the particular pixel.

18. The electronic device of claim 16, wherein the one or more processors are configured to correct chromatic aberration of the downsampled low-frequency component image by, for a particular pixel of the downsampled low-frequency component image:

generating a filtered version of the particular pixel by filtering the particular pixel using a neighborhood of pixels surrounding the particular pixel; and generating a color-corrected version of the particular pixel based on the likelihood that the particular pixel exhibits chromatic aberration and the filtered version of the pixel.

19. The electronic device of claim 18, wherein the one or more processors are configured to correct chromatic aberration of the downsampled low-frequency component image by, for a particular pixel of the downsampled low-frequency component image:

determining a purpleness of the particular pixel; and generating a desaturated version of the particular pixel by at least partially desaturating the particular pixel based on the purpleness of the particular pixel, wherein generating the color-corrected version of the particular pixel is further based on the desaturated version of the particular pixel.

20. A non-transitory computer-readable medium having instructions encoded thereon that, when executed by one or more processors of an electronic device, causes the electronic device to perform a method comprising:

obtaining an image;

splitting the image to produce a high-frequency component image and a low-frequency component image;

downsampling the low-frequency component image to generate a downsampled low-frequency component image;

correcting chromatic aberration of the downsampled low-frequency component image to generate a color-corrected downsampled low-frequency component image;

upsampling the color-corrected downsampled low-frequency component image to generate a color-corrected low-frequency component image; and combining the color-corrected low-frequency component image and the high-frequency component image to generate a color-corrected version of the image.

* * * * *